United States Patent [19]
Radencic

[11] Patent Number: 5,326,086
[45] Date of Patent: Jul. 5, 1994

[54] CUTTING RACK

[76] Inventor: Frank Radencic, 7932 Haskell, Kansas City, Kans. 66109

[21] Appl. No.: 76,311

[22] Filed: Jun. 14, 1993

[51] Int. Cl.⁵ .......................................... B23Q 1/00
[52] U.S. Cl. ............................................. 269/54.5
[58] Field of Search ............. 269/302.1, 289 R, 54.5, 269/54.4, 53; 248/205.5, 205.7, 206.3, 206.4; 452/196

[56] References Cited

U.S. PATENT DOCUMENTS

| | | |
|---|---|---|
| D233,203 | 10/1974 | Hughes . |
| D314,892 | 2/1991 | Sata . |
| 856,022 | 6/1907 | Booth ............................ 269/54.5 |
| 943,767 | 12/1909 | Bullard . |
| 1,471,122 | 10/1923 | Greaves . |
| 2,031,307 | 2/1936 | Gloekler . |
| 2,751,951 | 6/1956 | Strathaus . |
| 2,888,054 | 5/1959 | Graham . |
| 2,942,639 | 6/1960 | Margolis . |
| 2,953,180 | 9/1960 | Kyles ............................ 269/54.5 |
| 3,958,797 | 5/1976 | Brow ............................ 269/302.1 |
| 4,989,846 | 2/1991 | Quinn . |
| 7,729,134 | 9/1977 | Bassereau . |

Primary Examiner—Robert C. Watson
Attorney, Agent, or Firm—Hovey, Williams, Timmons & Collins

[57] ABSTRACT

A cutting rack is presented which includes a base, a plurality of tines extending upwardly from the base for securing meat or other victuals thereto, and at least one suction cup or other member pivotally attached at one end of the base for holding the base to a supporting surface, thereby permitting the user to grasp the opposite end and pivot the base to obtain the most advantageous cutting position. The suction cup is preferably located within a relieved area at one end of the base which permits the underside of the base to lie flush with the supporting surface. Two suction cups may be located at opposite ends of the base, thereby permitting the base to be fixed in position when both are secured to the supporting surface, or only one may be placed in suction to allow pivoting of the base. A plurality of tines of different heights are press-fitted into the base to permit removal for cleaning and for holding odd-shaped meat items such as hams.

7 Claims, 1 Drawing Sheet

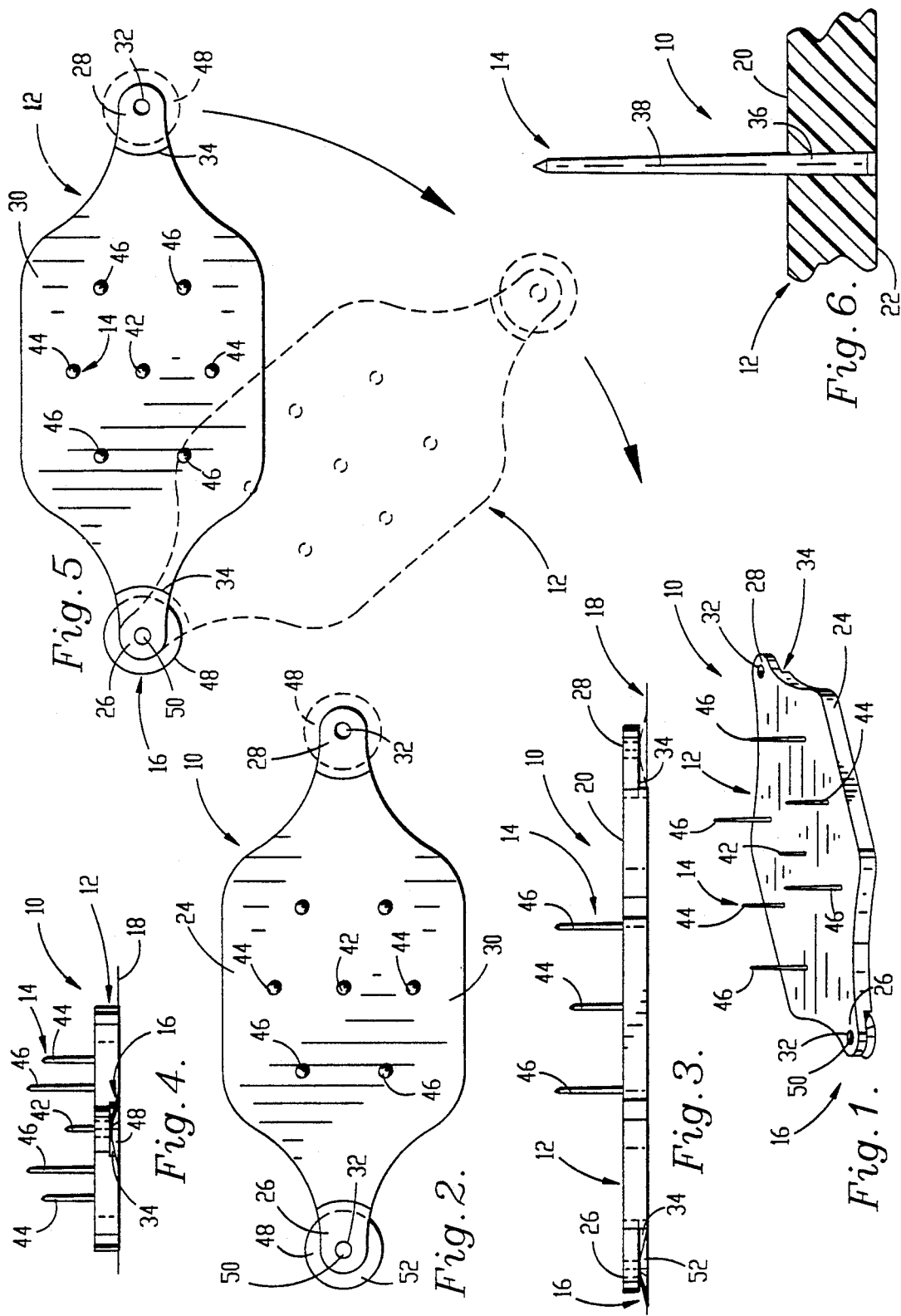

CUTTING RACK

BACKGROUND OF THE INVENTION

1. Field of the Invention

This invention concerns a cutting rack for holding meats or other victuals to be sliced which includes a base which may be pivoted to present the most advantageous cutting position. More particularly, it includes a cutting rack including suction cups or the like which may be attached to a supporting surface without penetrating the latter.

2. Description of the Prior Art

Cutting racks of the type discussed herein are designed to be placed on a countertop, table or other supporting surface and to enable the user to more securely hold a victual such as meat, produce, etc. thereon during slicing. At the same time, it is desirable for the user to keep his or her hands clear of the food to prevent injury when a knife slips.

To accomplish these ends, cutting racks have been devised with upwardly extending tines which penetrate the victual and thus secure it to the base. Typically, the tines are embedded in a wooden base which supports the victual and allows cutting without damage to the supporting surface or knife. A plurality of feet typically hold the cutting board at a desired elevation above the supporting surface.

Prior art cutting racks are shown generally by U.S. Pat. Nos. 943,767; 1,471,122; 2,031,307; 2,888,054; 2,942,639; 4,989,846; Des. 233,203 and Des. 314,892. While these racks are generally useful, certain advances would make these racks easier to use and store, while remaining of a simplified construction for use. Accordingly, there has developed a need for a cutting rack which is simple to construct and facilitates easy cutting by the user while remaining secure on a countertop or other supporting surface.

SUMMARY OF THE INVENTION

These objects have largely been realized by the cutting rack of the present invention which is simple to construct and allows the user to shift the board to the most desirable attitude or position for cutting victuals held thereon.

The cutting rack hereof includes a base which is provided with a top face on which meats such as ham, roasts, poultry, or other victuals such as produce may be placed. The base includes a pair of opposed ends, at least one of which includes a member such as a suction cup or the like which is capable of securing the base to a supporting surface without penetrating the latter. The securing member is pivotally mounted to the base to permit the latter to be shifted to place the meat or other victual in a desired orientation to the user. A plurality of tines project upwardly from the top face to hold the victual in position on the base.

The base is preferably substantially planar and receives suction cups at each of the longitudinal ends. Relieved areas are provided in the underside at each end whereby the underside may lie flat on a countertop or the like when the suction cups are attached to the supporting surface. The base may then be used in either a pivoting mode as described above or secured in position on the supporting surface by both suction cups. The use of suction cups provides sufficient adherence to a smooth supporting surface such as a table or countertop and maintains ease of cleaning and portability for storage without the necessity of penetrating the countertop with screws or the like.

The tines are uniquely arrayed to maximize the ability to hold a piece of meat such as ham which presents an arcuate outside surface and is essentially hemispherical in configuration. By providing tines of different lengths and arranging them such that the shortest tines are positioned medially or essentially relatively inboard of the surrounding margin in comparison to the longer tines which are positioned closer to the margin and the ends, hams and the like may be cut and the ability to continue to cut meat without the knife contact the tines as the end of the ham is reached is maximized. The tines are preferably substantially conical in configuration and sized to press-fit into corresponding frustoconical holes in the base for enabling the tines to be removed for cleaning and/or storage.

While no cutting rack can eliminate injury due to inadvertent cutting by a carving knife, the present invention presents a distinct improvement in this regard. In the usual practice, the carver may use a fork or hand to hold the meat during carving, and also maneuver the meat on the base to position it properly for carving. In the present case, the carver can use his or her free hand to grasp one end and pivot that unsecured end of the base about the secured end. The carver thus enjoys the advantages of a cutting rack while simultaneously having the meat held in position relative to the supporting surface and enjoying the ability to easily reposition the meat at a desired attitude during carving.

These and other advantages may be readily appreciated by reference to the drawings and specification which follows.

BRIEF DESCRIPTION OF THE DRAWINGS

FIG. 1 is a perspective view showing the cutting rack of the present invention with one suction cup removed;

FIG. 2 is a top plan view of the present invention with one of the suction cups shown in phantom;

FIG. 3 is a side elevational view of the present invention;

FIG. 4 is an end elevational view of the present invention;

FIG. 5 is a top plan view of the present invention showing in phantom the cutting rack pivoting about the suction cup located at one end; and FIG. 6 is an enlarged, cross-sectional view of the base and one of the tines hereof.

DESCRIPTION OF THE PREFERRED EMBODIMENT

Referring now to the drawing, a cutting rack 10 in accordance with the present invention includes a base 12, tines 14 which extend upwardly from the base for securing meat or other victuals on the base 12, and securing means 16 which are pivotally mounted to the base 12 and secure the base 12 to a supporting surface 18 without penetrating the latter.

In greater detail, base 12 is preferably made of wood, acrylic, or other material which is rugged yet not so hard as to significantly dull a knife, although other materials could be used with less satisfactory results. The base 12 includes a top face 20 and an underside 22, the latter being preferably substantially planar for resting on a countertop, table, or other flat supporting surface 18. A circumscribing margin 24 defines a first end 26 and an opposing second end 28 which are narrower than the body 30 for ease in grasping. Each of the first end 26 and second end 28 are provided with a hole 32 extending vertically therethrough sized to receive the securing means 16 therein. The underside 22 has been provided with a relieved area 34 having a radius greater than the radius of the securing means 16 so that the base 12 is free to pivot thereabout. A plurality of frustoconically shaped openings 36 are defined in the base 12 as shown in FIG. 6 for receiving tines 14 in press-fit relationship therein.

Tines 14 have a conically shaped surface 38 ending in a point 40. The tines 14 are of metal such as stainless steel or aluminum and include, for example, short tine 42 positioned centrally on the base 12, medium length tines 44 positioned outboard therefrom, and long tines 46 positioned more proximate ends 26 and 28 than either tine 42 or tines 44. Each tine is individually and preferably removably press-fit into its respective opening 36, although cementing is an acceptable alternative.

Securing means 16 includes suction cups 48, each of which include a header 50 made of synthetic resin such as acrylic, nylon of Delrin which permits relative pivotal or rotational movement between the suction cups 48 and the base 12 by limiting frictional engagement therebetween. Each suction cup 48 also includes a flexible and resilient frustoconically shaped foot 52 of synthetic resin or rubber which serves to hold the base 12 to the supporting surface 18 without penetrating the supporting surface with screws or the like. A suction cup 48 may be positioned at either or both ends 26 and 28 whereby the base 12 may be held stationary to the supporting surface 18. In this regard, the base 12 may be held by only one suction cup at one end for permitting pivoting movement about the suction cup 48 as shown in FIG. 5, or alternatively both suction cups 48 may be inserted into the holes 32 to allow the cutting rack 10 to be fixed against pivoting.

In use, a ham or other victual may be placed on the cutting rack 10 and held in position by tines 14. Preferably, a ham with a substantially hemispherical shape would be positioned with its flat side up and its arcuate side down such that the center of the ham was positioned on short tine 42. The carver would then place one of the suction cups 48 in suction with the supporting surface 18 and grasp the opposite end (e.g., end 28 in FIG. 5) to cause the cutting rack to pivot about the affixed suction cup 48. The underside 22 is flat and lies flush with the supporting surface 18 because of the relieved areas 34 at each end. Accordingly, a stable surface is provided which holds the victual and allows the carver's hands to remain at a distance from the carving knife. When it is desirable to fix the base 12 at a desired orientation so that the carver may use a utensil in the other hand, the suction cup 48 shown in phantom in FIGS. 2, 3 and 5 at end 28 may be pressed into suction with the supporting surface 18, and released by pulling up thereon as is conventional.

The placement of the tines allows a ham, or indeed any victual to be securely held. When the cutting or slicing is completed, the tines 14 may be removed for cleaning and eventual storage of the cutting rack 10 by simply pressing down thereon to remove them from the base 12.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the liberal scope of the invention as set out in the following claims.

I claim:

1. A cutting rack for holding a victual comprising:
   a base presenting a body for receiving a victual thereon and having a first end and an opposed second end projecting outwardly from said body and each of said ends having a bottom surface, said body presenting a top face and a substantially planar underside, each of said ends presenting a relieved area between each end bottom surface and said body underside for locating said end bottom surfaces in spaced relationship to a supporting surface engaged by the underside of said body;
   a plurality of tines projecting upwardly from the top face of said base for holding the victual in position on the body of the base; and
   means for defining only a single upright pivot axis passing through one of said ends, including structure pivotally and removably connected to the bottom surface of said one of said ends of said base and positioned in said relieved area for releasably securing said base to a supporting surface without penetration of the latter.

2. A cutting rack for holding a victual as set forth in claim 1 wherein said securing means comprising a suction cup.

3. A cutting rack for holding a victual as set forth in claim 1 including a second securing means pivotally connected to the other of said ends.

4. A cutting rack for holding a victual as set forth in claim 3 wherein each of said securing means comprises a suction cup.

5. A cutting rack for holding a victual as set forth in claim 4 wherein each of said suction cups is removably mounted to said base.

6. A cutting rack for holding a victual as set forth in claim 1, said base including a plurality of frustoconically-shaped openings complementally configured with plurality of tines for receiving said tines therein in removable, press-fit relationship.

7. A cutting rack for holding a victual as set forth in claim 1, said plurality of tines including tines of greater and lesser lengths, wherein said tines having a lesser length are positioned relatively medially on said base and greater length are positioned more proximate the ends of said base.

* * * * *